(12) United States Patent
Ting

(10) Patent No.: US 8,008,881 B2
(45) Date of Patent: Aug. 30, 2011

(54) VOLTAGE PROTECTING APPARATUS

(75) Inventor: Chin-Hsien Ting, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/252,365

(22) Filed: Oct. 16, 2008

(65) Prior Publication Data

US 2010/0066290 A1    Mar. 18, 2010

(30) Foreign Application Priority Data

Sep. 12, 2008   (CN) .......................... 2008 1 0304488

(51) Int. Cl.
*H02K 17/32* (2006.01)
(52) U.S. Cl. ..................... 318/434; 318/375; 318/376
(58) Field of Classification Search .............. 318/434, 318/375, 376, 379, 380, 381, 757, 759, 727, 318/268; 361/33
See application file for complete search history.

(56) References Cited

U.S. PATENT DOCUMENTS

2004/0227479 A1* 11/2004 Youm .......................... 318/375
* cited by examiner

*Primary Examiner* — Karen Masih
(74) *Attorney, Agent, or Firm* — Altis Law Group, Inc.

(57) ABSTRACT

A voltage protecting apparatus is used for detecting voltage of a motor driver, and adjusting the voltage of the motor driver when at an over-voltage state. The motor driver includes a direct current (DC) power source and a power board. The voltage protecting apparatus includes a switch unit, a voltage transform unit, a controller, a voltage detector, and an over-voltage judger. When the controller outputs a high level signal, the switch unit is turned on, the voltage transform unit transforms the output voltage of the DC power source to a low voltage. The over-voltage judger receives the low voltage and compares the low voltage to a predetermined voltage. When the low voltage is greater than the predetermined voltage, the over-voltage judger outputs a control signal to the controller for signaling the controller to control the power board so as to adjust the voltage of the motor driver.

10 Claims, 2 Drawing Sheets

VOLTAGE PROTECTING APPARATUS

BACKGROUND

1. Field of the Invention

Embodiments of the present disclosure relate to voltage protecting apparatuses and, particularly, to a voltage protecting apparatus of a motor driver.

2. Description of Related Art

Motors are widely applied to various automatic control systems. Motor drivers drive motors to work, the motor drivers are designed to operate in a certain voltage range, and damage may be caused by voltage exceeding the maximum voltage the motor drivers are rated for. A typical method for preventing the motor drivers from over-voltage is using voltage sensors. However, these voltage sensors are expensive.

What is needed, therefore, is to provide a voltage protecting apparatus which can solve the above-mentioned problems.

DETAILED DESCRIPTION

Figure 1:
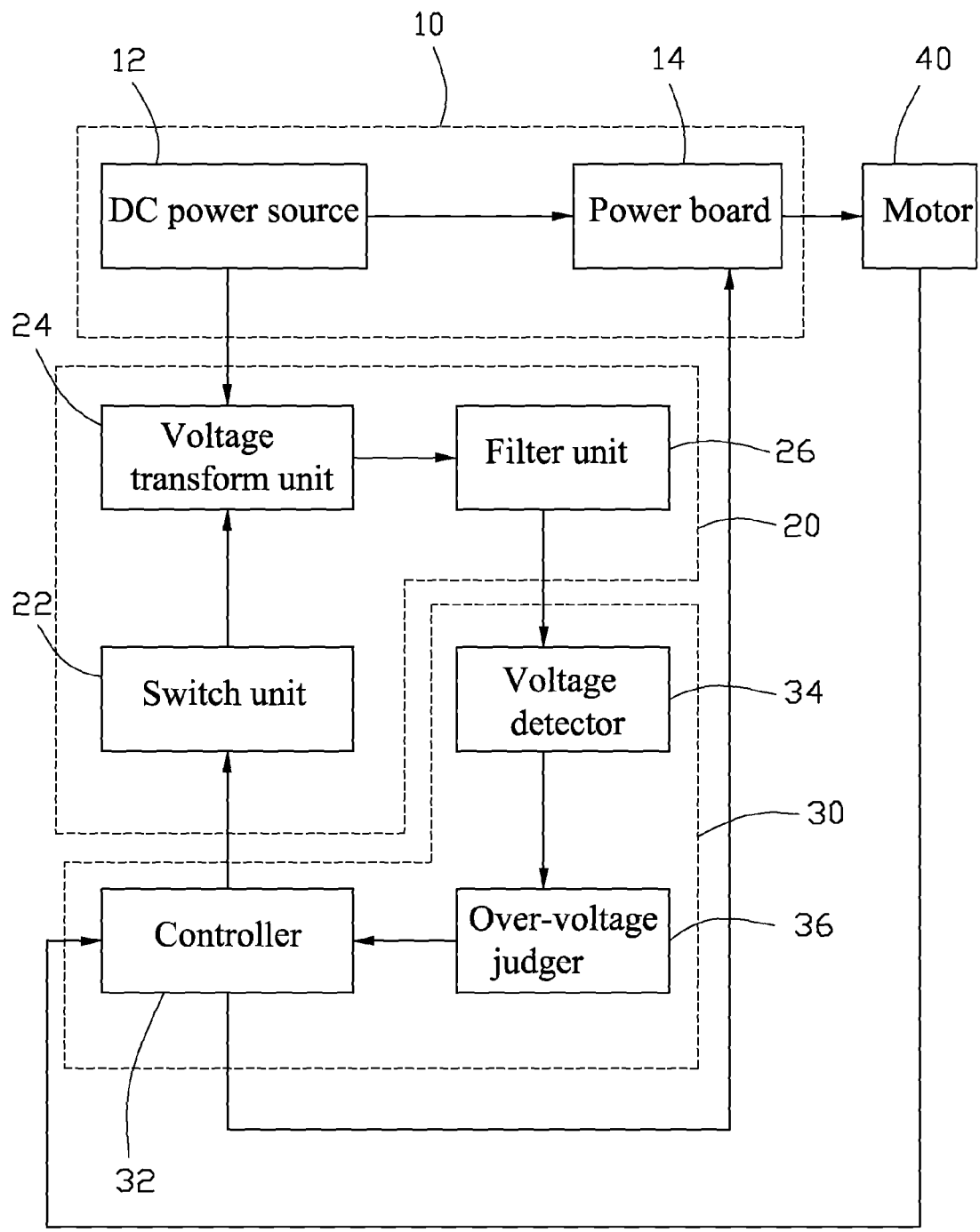
FIG. 1 is a block diagram of a voltage protecting apparatus in accordance with an embodiment of the present disclosure.

Referring to FIG. 1, one embodiment of a voltage protecting apparatus for detecting voltages and adjusting the voltage of the motor driver 10 is shown. The motor driver 10 includes a direct current (DC) power source 12 and a power board 14. The DC power source 12 drives a motor 40 via the power board 14. The voltage protecting apparatus includes a voltage transform circuit 20 and a control circuit 30. The voltage transform circuit 20 includes a switch unit 22, a voltage transform unit 24, and a filter unit 26. The control circuit 30 includes a controller 32, such as a processor, a voltage detector 34, and an over-voltage judger 36.

The controller 32 adjusts a frequency of a pulse-width modulation (PWM) signal according to a movement status of the motor 40 and outputs the PWM signal, and then the controller 32 adjusts a frequency of detecting the voltage of the motor driver 10 according to the frequency of the PWM signal. The frequency of the PWM signal at the motor 40 movement abnormality is greater than the frequency of the PWM signal at the motor 40 movement normality. The PWM signal controls the switch unit 22 to be turned on or turned off. When the switch unit 22 is turned on, the voltage transform unit 24 transforms the output voltage of the DC power source 12 to a low voltage Vout and sends the low voltage Vout to the voltage detector 34 via the filter unit 26. The voltage detector 34 sends the low voltage Vout to the over-voltage judger 36. The over-voltage judger 36 receives the low voltage Vout from the voltage detector 34 and compares the low voltage Vout to a predetermined voltage. If the low voltage Vout is greater than the predetermined voltage, the over-voltage judger 36 outputs a control signal to the controller 32 for signaling the controller 32 to control the power board 14 so as to adjust the voltage of the motor driver 10. The voltage protecting apparatus prevents over-voltage damage to the motor driver 10.

Figure 2:
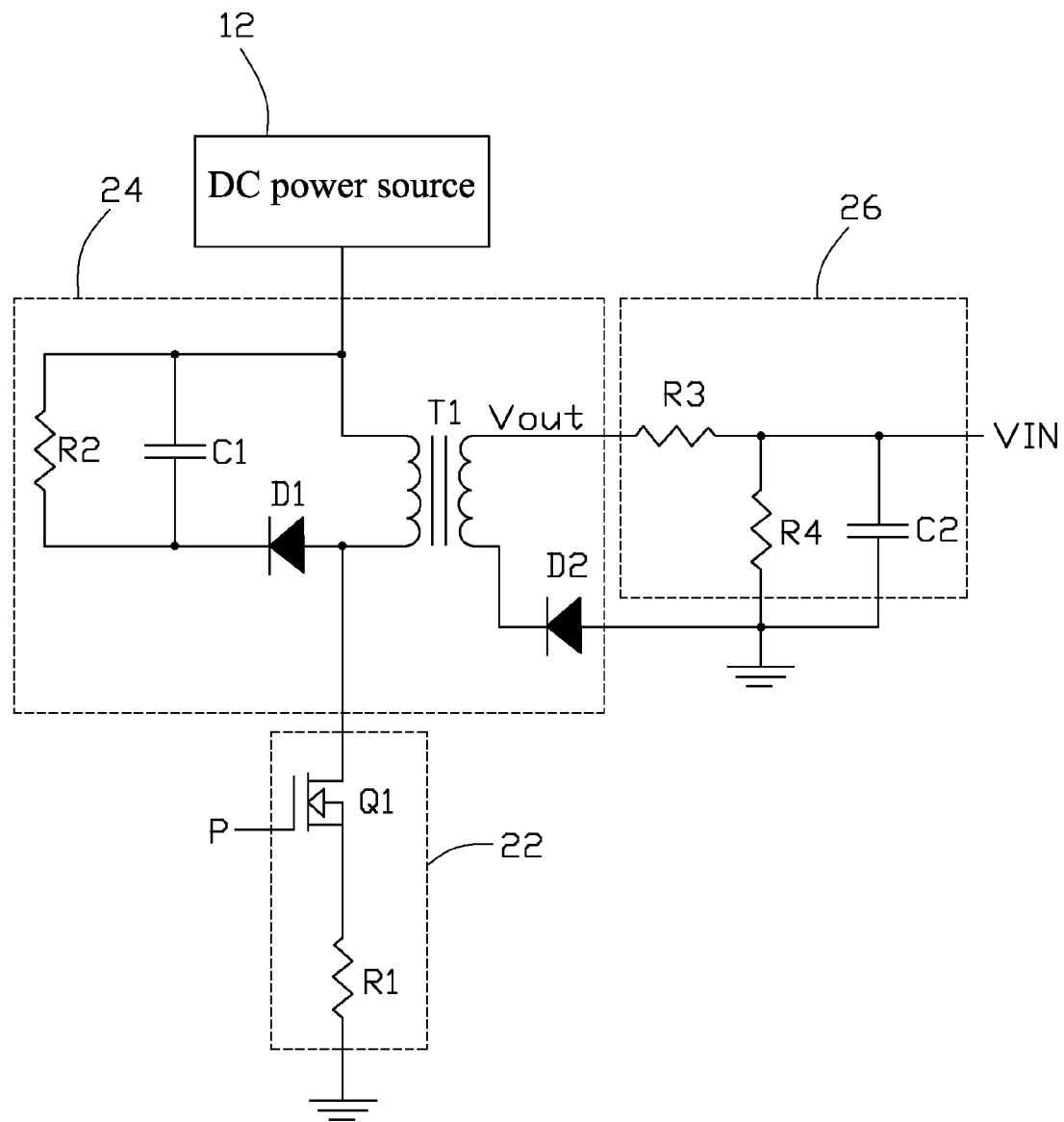
FIG. 2 is a circuit diagram of a voltage transform circuit of FIG. 1.

Referring to FIG. 2, the switch unit 22 includes a field effect transistor (FET) Q1 and a resistor R1. The gate of the FET Q1 is connected to a pulse pin P of the controller 32 for receiving the PWM signal. The source of the FET Q1 is grounded via the resistor R1. The drain of the FET Q1 is connected to the voltage transform unit 24.

The voltage transform unit 24 includes a transformer T1, a capacitor C1, a resistor R2, and the two diodes D1 and D2. The DC power source 12 is connected to the anode of the diode D1 via the primary coil of the transformer T1, and connected to the cathode of the diode D1 via the resistor R2. The capacitor C1 and the resistor R2 are connected in parallel. The anode of the diode D1 is connected to the drain of the FET Q1. One end of the secondary coil of the transformer T1 is connected to the cathode of the diode D2. The other end of the secondary coil of the transformer T1 is connected to the filter unit 26. The anode of the diode D2 is grounded. In one embodiment, polarities of the primary coil and the secondary coil of the transformer T1 are the same. When polarities of the primary coil and the secondary coil of the transformer T1 are different, one end of the secondary coil of the transformer T1 is connected to the anode of the diode D2. The cathode of the diode D2 is grounded.

The filter unit 26 includes a capacitor C2 and two resistors R3, R4. The other end of the secondary coil of the transformer T1 is connected to an input pin VIN of the voltage detector 34 via the resistor R3. The input pin VIN is connected to the anode of the diode D2 via the capacitor C2. The resistor R4 and the capacitor C2 are connected in parallel. In one embodiment, the filter unit 26 is used for filtering, and can be omitted to save cost.

In use, the motor driver 10 drives the motor 40 to work, because an input voltage of the voltage transform unit 24 is a direct current (DC) voltage, the controller 32 needs to output a PWM signal for controlling the switch unit 22 to be turned on or turned off to control the transformer T1 to work. When the controller 32 outputs a high level signal of the PWM signal, the FET Q1 is turned on. The transformer T1 transforms the output voltage of the DC power source 12 to a low voltage Vout, and sends the low voltage Vout to the voltage detector 34 via the filter unit 26. The voltage detector 34 sends the low voltage Vout to the over-voltage judger 36. The over-voltage judger 36 receives the low voltage Vout from the voltage detector 34 and compares the low voltage Vout to a predetermined voltage. If the low voltage Vout is greater than the predetermined voltage, the over-voltage judger 36 outputs a control signal to the controller 32 for signaling the controller 32 to control the power board 14 so as to adjust the voltage of the motor driver 10. The voltage protecting apparatus prevents an over-voltage from damaging the motor driver 10.

For example, the voltage output from the motor driver 10 during the motor 40 deceleration is greater than the voltage output from the motor driver 10 when the motor 40 runs normally. The controller 32 outputs a PWM signal with a high frequency according to the movement states of the motor 40 to increase a frequency of the detecting voltage of the motor driver 10 via the switch unit 22 and the voltage transform unit 24 for making the power boar 14 quickly adjust the voltage of the motor driver 10. Thereby, the motor driver 10 can avoid being damaged.

The controller 32 is configured to output a PWM signal to control the FET Q1 to be turned on or turned off. When the FET Q1 is turned on, the transformer T1 transforms the output voltage of the DC power source 12 to a low voltage Vout, and sends the low voltage Vout to the voltage detector 34 via the filter unit 26. The voltage detector 34 sends the low voltage Vout to the over-voltage judger 36. The over-voltage judger 36 receives the low voltage Vout from the voltage detector 34 and compares the low voltage Vout to a predetermined voltage. If the low voltage Vout is greater than the predetermined voltage, the over-voltage judger 36 outputs a control signal to the controller 32 for signaling the controller 32 to control the power board 14 so as to adjust the voltage of the motor driver 10. The voltage protecting apparatus prevents an over-voltage from damaging the motor driver 10. The voltage protecting apparatus is simple and low-cost.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voltage protecting apparatus for detecting voltage of a motor driver, and adjusting the voltage of the motor driver when in an over-voltage state, the motor driver comprising a direct current power source and a power board, the direct current power source drive a motor via the power board, the voltage protecting apparatus comprising:
   a switch unit;
   a voltage transform unit configured to transform an output voltage of the direct current power source to a low voltage;
   a controller configured to output a pulse width modulation signal according to movement states of the motor and adjust the voltage of the motor driver via the power board;
   a voltage detector configured to receive the low voltage from the voltage transform unit; and
   an over-voltage judger configured to receive the low voltage from the voltage detector and compare the low voltage to a predetermined voltage;
   wherein when the controller outputs a high level signal, the switch unit is turned on, the voltage transform unit transforms the output voltage of the direct current power source to the low voltage and sends the low voltage to the voltage detector, the over-voltage judger receives the low voltage from the voltage detector and compares the low voltage to a predetermined voltage, when the low voltage is greater than the predetermined voltage, the over-voltage judger outputs a control signal to the controller for signaling the controller to control the power board so as to adjust the voltage of the motor driver.

2. The voltage protecting apparatus as claimed in claim 1, wherein the frequency of the pulse width modulation signal is capable of being adjusted according to the movement states of the motor, the frequency of the pulse width modulation signal at the motor movement abnormality is greater than the frequency of the pulse width modulation signal at the motor movement normality.

3. The voltage protecting apparatus as claimed in claim 2, wherein the controller is a processor.

4. The voltage protecting apparatus as claimed in claim 1, wherein the voltage transform unit is connected to the voltage detector via a filter unit, the filter unit is used for filtering.

5. The voltage protecting apparatus as claimed in claim 4, wherein the switch unit comprises a field effect transistor, the gate of the field effect transistor is connected to a pulse pin of the controller, the source of the field effect transistor is grounded, and the drain of the field effect transistor is connected to the voltage transform unit.

6. The voltage protecting apparatus as claimed in claim 5, wherein the switch unit further comprises a first resistor, the first resistor is connected between the source of the field effect transistor and ground.

7. The voltage protecting apparatus as claimed in claim 5, wherein the voltage transform unit comprises a transformer, a first capacitor, a second resistor, a first diode, and a second diode, polarities of the primary coil and the secondary coil of the transformer are the same, the direct current power source is connected to the anode of the first diode via the primary coil of the transformer, and connected the cathode of the first diode via the second resistor, the capacitor and the second resistor are connected in parallel, the anode of the first diode is connected to the drain of the field effect transistor, a first terminal of the secondary coil of the transformer is connected to the cathode of the second diode, and a second terminal of the secondary coil of the transformer is connected to the filter unit, the anode of the second diode is ground.

8. The voltage protecting apparatus as claimed in claim 7, wherein the filter unit comprises a second capacitor, a third resistor, and a fourth resistor, the first terminal of the secondary coil of the transformer is connected to an input pin of the voltage detector via the third resistor, the input pin of the voltage detector is connected to the anode of the second diode via the second capacitor, the fourth resistor and the second capacitor are connected in parallel.

9. The voltage protecting apparatus as claimed in claim 5, wherein the voltage transform unit comprises a transformer, a first capacitor, a second resistor, a first diode, and a second diode, polarities of the primary coil and the secondary coil of the transformer are different, the direct current power source is connected to the anode of the first diode via the primary coil of the transformer and connected to the cathode of the first diode via the second resistor, the first capacitor and the second resistor are connected in parallel, the anode of the first diode is connected to the drain of the field effect transistor, a first terminal of the secondary coil of the transformer is connected to the filter unit, and a second terminal of the secondary coil of the transformer is connected to the anode of the second diode, the cathode of the second diode is grounded.

10. The voltage protecting apparatus as claimed in claim 9, wherein the filter unit comprises a second capacitor, a third resistor, and a fourth resistor, the first terminal of the secondary coil of the transformer is connected to an input pin of the voltage detector via the third resistor, the input pin of the secondary coil of the transformer is connected to the cathode of the second diode via the second capacitor, the fourth resistor and the second capacitor are connected in parallel.

* * * * *